US006980328B2

(12) United States Patent
Hudson

(10) Patent No.: US 6,980,328 B2
(45) Date of Patent: Dec. 27, 2005

(54) DIRECTION-DEPENDENT COLOR CONVERSION IN BIDIRECTIONAL PRINTING

(75) Inventor: Kevin R Hudson, Camas, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 906 days.

(21) Appl. No.: 09/899,466

(22) Filed: Jul. 5, 2001

(65) Prior Publication Data

US 2003/0007165 A1 Jan. 9, 2003

(51) Int. Cl.⁷ ............................................. G06F 15/00
(52) U.S. Cl. .................. 358/1.9; 358/3.26; 358/502; 358/518; 347/12
(58) Field of Search ................ 358/1.9, 3.26, 358/502, 518; 347/7, 12, 43

(56) References Cited

U.S. PATENT DOCUMENTS

| 5,610,639 A | 3/1997 | Takada et al. | |
|---|---|---|---|
| 6,213,584 B1 * | 4/2001 | Noyes et al. | 347/40 |
| 6,705,695 B2 * | 3/2004 | Otsuki | 347/9 |
| 6,863,367 B2 * | 3/2005 | Hamamoto et al. | 347/23 |

FOREIGN PATENT DOCUMENTS

| EP | 0737001 | 10/1996 |
|---|---|---|
| EP | 0737001 A2 | 10/1996 |
| EP | 1048475 | 11/2000 |
| EP | 1072421 | 1/2001 |
| EP | 1273453 | 1/2003 |

OTHER PUBLICATIONS

European Search Report dated Jan. 28, 2003.

* cited by examiner

*Primary Examiner*—Mark Wallerson
*Assistant Examiner*—Satwant Singh

(57) ABSTRACT

A color printing system and method for reducing bidirectional hue shift in inkjet printing. A set of data channels for the ink colors of the system is generated, including at least one print-direction-independent data channel, and at least one pair of print-direction-dependent data channels. A print controller receives the set of data channels for printing, and selects the print-direction-independent data channels, and one of each pair of print-direction-dependent data channels, to provide the data for printing in each opposite scanning direction of the print engine.

24 Claims, 9 Drawing Sheets

RGB-to-KCMYC'M' COLOR MAP

| COLOR | INPUT | | | | OUTPUT | | | | |
|---|---|---|---|---|---|---|---|---|---|
| | R | G | B | K | C | M | Y | C' | M' |
| WHITE | 255 | 255 | 255 | 0 | 0 | 0 | 0 | 0 | 0 |
| VERY LIGHT BLUE | 240 | 240 | 255 | 0 | 5 | 9 | 0 | 5 | 9 |
| LIGHT BLUE | 224 | 224 | 255 | 0 | 11 | 21 | 0 | 11 | 21 |
| ... | ... | ... | ... | ... | ... | ... | ... | ... | ... |
| VERY DARK BLUE | 0 | 0 | 255 | 0 | 160 | 200 | 0 | 170 | 185 |
| ... | ... | ... | ... | ... | ... | ... | ... | ... | ... |
| VERY DARK GREEN | 0 | 255 | 0 | 0 | 190 | 0 | 170 | 200 | 0 |
| ... | ... | ... | ... | ... | ... | ... | ... | ... | ... |
| VERY DARK RED | 255 | 0 | 0 | 0 | 0 | 200 | 170 | 0 | 180 |

EXAMPLE:
- "VERY DARK BLUE" PRINTED WHILE SCANNING RIGHT-TO-LEFT USES VALUES OF C=160, M=200
- "VERY DARK BLUE" PRINTED WHILE SCANNING LEFT-TO-RIGHT USES VALUES OF C=170, M=185

FIG.7

DIRECTION-DEPENDENT COLOR CONVERSION IN BIDIRECTIONAL PRINTING

FIELD OF THE INVENTION

The present invention relates generally to inkjet printing, and pertains more particularly to providing high image quality in bidirectional printing.

BACKGROUND OF THE INVENTION

Hardcopy output devices, such as printers and fax machines, frequently use inkjet technology to form text and images on print media such as paper, transparencies, and textiles. Hardcopy devices of this sort are described by W. J. Lloyd and H. T. Taub in "Ink Jet Devices," Chapter 13 of *Output Hardcopy Devices* (Ed. R. C. Durbeck and S. Sherr, San Diego: Academic Press, 1988). A printhead in these output devices is connected to an ink supply and contains an arrangement of nozzles and a control mechanism which allows ink drops from the ink supply to be controllably ejected from each individual nozzle onto the media. Color inkjet printing devices frequently contain several printheads, typically four to six. The printheads generally are mounted side-by-side in a carriage which scans them back and forth within the printer in a forward and a rearward direction above the media during printing such that the individual printheads move sequentially over a given location on the medium. As the printhead is moved relative to the print medium, a controller selectively activates individual printing elements in the printhead to eject ink droplets through the nozzles and deposit them onto the print medium. Since the printheads are generally much smaller than the image to be printed, the image is divided into regions of appropriate size, called swaths, each of which can be printed in a forward or rearward scan of the carriage. The layout of the printhead nozzles determines the size of the media swath that can be printed during a scan. The printer also has a print medium advance mechanism which moves the media relative to the printheads so that, by combining the scans of the print cartridges back and forth across the media with the advance of the media relative to the printheads, ink can be deposited on the entire printable area of the media. The controller typically orchestrates the scanning, media advance, and ink drop ejection operations, including such printing aspects as how many scans are required to fully print a section of the media, how much the media is advanced between scans, and which portions of the image are printed during which scans. Further information as to the basics of inkjet printing technology are further disclosed in various articles in several editions of the *Hewlett-Packard Journal* [Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994)], incorporated herein by reference.

A color inkjet printing system typically uses several different color ink supplies, each fluidically connected to one of the printheads, to produce color print output. A typical set of four color inks includes cyan, magenta, yellow, and black inks. During printing, drops of different ones of these inks may be deposited in the same or adjacent pixel locations to form a range of colors as perceived by the human eye.

The fastest way to print a swath is to scan in one direction while ejecting all the ink drops associated with the image to be printed in the swath, advance the media the height of the swath, then scan in the opposite direction while ejecting ink drops as before. This is known as single-pass bidirectional printing. It is "single-pass" because the printheads pass over each area of the media only one time. It is "bidirectional" because drops are fired while the printheads are traveling in both the forward and rearward scan directions. However, single-pass bidirectional printing often suffers from reduced image quality that is particularly noticeable when a region of a particular color is partially printed in the forward scanning direction and partially printed in the rearward scanning direction. This image quality degradation occurs because the different color printheads are located in the carriage in a fixed sequence, thus reversing the order in which the different color ink drops will be deposited in a given location on the print medium in each scanning direction. Since the order in which different color inks are deposited on the print medium often slightly changes the hue or shade of the color as perceived by a human observer due to interactions between the ink and the media, image quality can suffer. This image quality defect is usually referred to as "bidirectional hue shift".

Accordingly, it would be highly desirable to have a new and improved inkjet printing system and printing method that reduce bidirectional hue shift without compromising throughput and without requiring extra cost or complexity in the printing system. Such a system and method may solve other problems as well.

SUMMARY OF THE INVENTION

In a preferred embodiment, the present invention provides a color printing system which includes a color converter which receives color print data and generates a set of data channels for the ink colors of the system. The set of data channels includes at least one print-direction-independent data channel, and at least one pair of print-direction-dependent data channels. A print controller receives the set of data channels for printing, and selects the print-direction-independent data channels, and one of each pair of print-direction-dependent data channels, to provide the data for printing in each opposite scanning direction of the print engine. In this way, bidirectional hue shift is reduced without compromising throughput and without increasing the cost or complexity of the printing system.

Another embodiment of the present invention is a color map with table entries, each of which associates a prespecified print-direction-independent input color primitive with at least one print-direction-independent output color primitive and at least one pair of print-direction-dependent output color primitives.

Yet another embodiment of the present invention is a method for printing with a bidirectional inkjet printer. The method converts a first set of color pixel data in a direction-independent data format into a second set of color pixel data having a direction-dependent data format which includes at least one direction-independent data segment and at least one pair of direction-dependent data segments. The direction-independent data segments, and one of each pair of direction-dependent data segments, is selected for printing in each opposite print direction.

BRIEF DESCRIPTION OF THE DRAWINGS

The above-mentioned features of the present invention and the manner of attaining them, and the invention itself, will be best understood by reference to the following detailed description of a preferred embodiment of the invention, taken in conjunction with the accompanying drawings, wherein:

FIG. 7 is an exemplary color map usable in the system of FIG. 5;

DESCRIPTION OF THE PREFERRED EMBODIMENT

Figure 1:
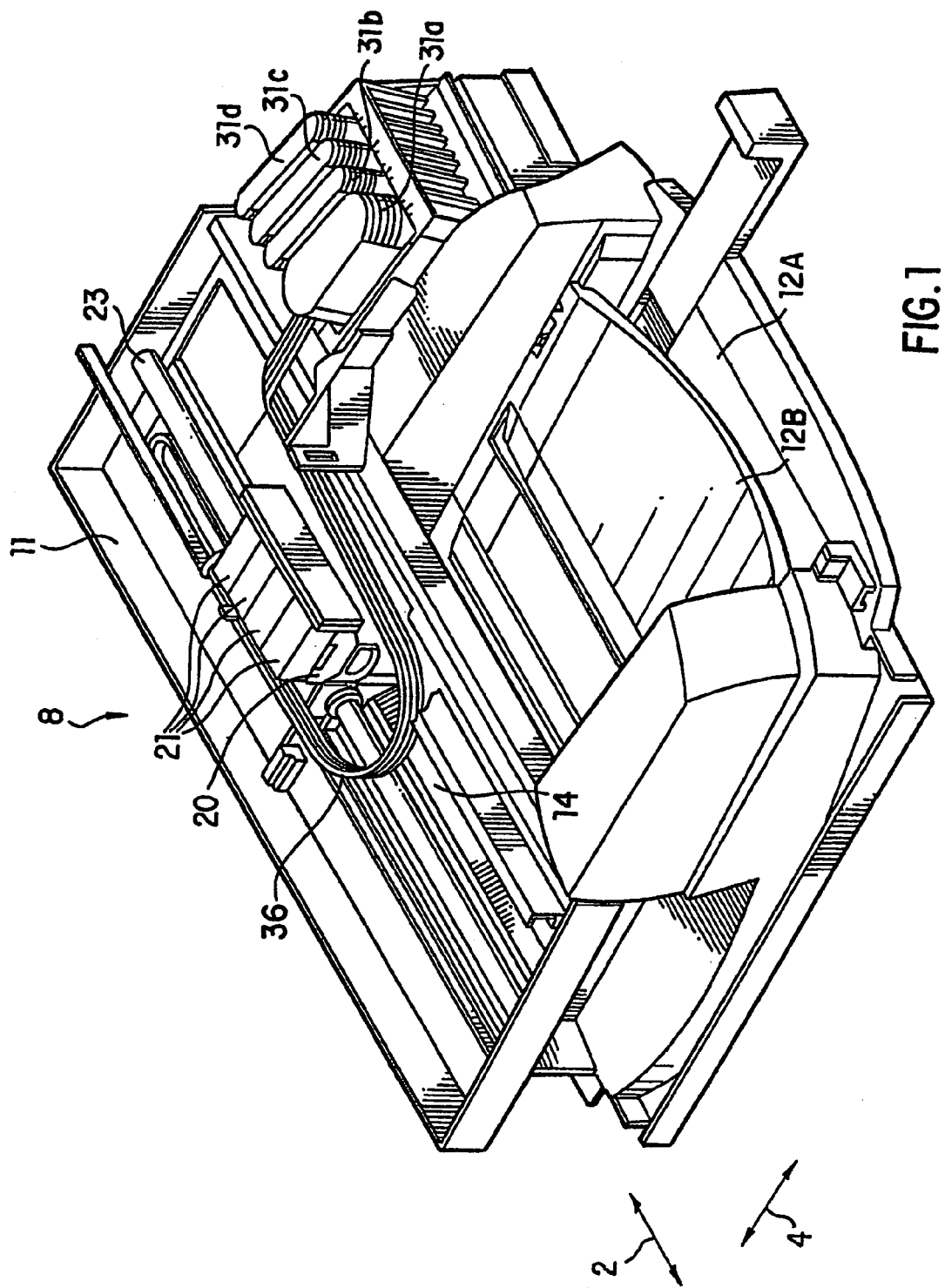
FIG. 1 is a perspective view of a print engine usable with the present invention.

Referring now to the drawings, there is illustrated a preferred embodiment of a color printing system constructed in accordance with the present invention which reduces undesirable bidirectional hue shift. A color converter receives color print data and generates a set of data channels that correspond to the ink colors of the printing system. These data channels include at least one print-direction-independent data channel for one ink color, and at least one pair of print-direction-dependent data channels for another ink color. A print controller receives the set of data channels from the color converter and in turn orchestrates the bidirectional scanning and ink ejecting operations of a print engine. In operation, the controller prints the data from the print-direction-independent data channels during scanning in both directions, and from a different one of each pair of print-direction-dependent data channels during scanning in each opposite direction. Since the data in each pair of data channels is optimized to correct for bidirectional hue shift, the novel printing system significantly reduces the hue shift that otherwise would occur between regions printed in different print directions without requiring a pair of data channels for each ink color.

Considering now a preferred embodiment of the printing system 10 in further detail, and with reference to FIG. 1, the print engine 8 includes a frame 11, an input tray 12a in which a supply of the media to be printed are stacked prior to printing, and an output tray 12b where the media are placed after printing is complete. Each sheet of print medium 18 is fed into the printer and positioned adjacent the carriage 20 for printing. The print medium 18 has a plurality of pixel locations, such as pixel location 19, organized in a rectangular array of rows 3 and columns 5 on the medium 18. Each printhead 21 is installed in the carriage 20 such that the nozzles (indicated generally at 24) through which the droplets of ink (or another fluid) are emitted are facing in a preferably downward direction so as to eject the ink or fluid onto the surface of the medium 18. Since ink is the preferred fluid, the invention will hereinafter be described with reference to ink, though it is understood that the fluid of the present invention is not limited to ink. Ink can be supplied to the printhead 21 in a number of different ways, including from a reservoir which is mounted with the printhead 21, or via a tube 36 from an off-carriage reservoir or vessel, such as one of reservoirs 31a–d. Different printheads 21 (four of which are illustrated in FIG. 1) typically contain different color inks, such as magenta, yellow, cyan, and black inks, drops of which can be controllably combined to form a variety of different colored spots on the medium 18.

Figure 3:
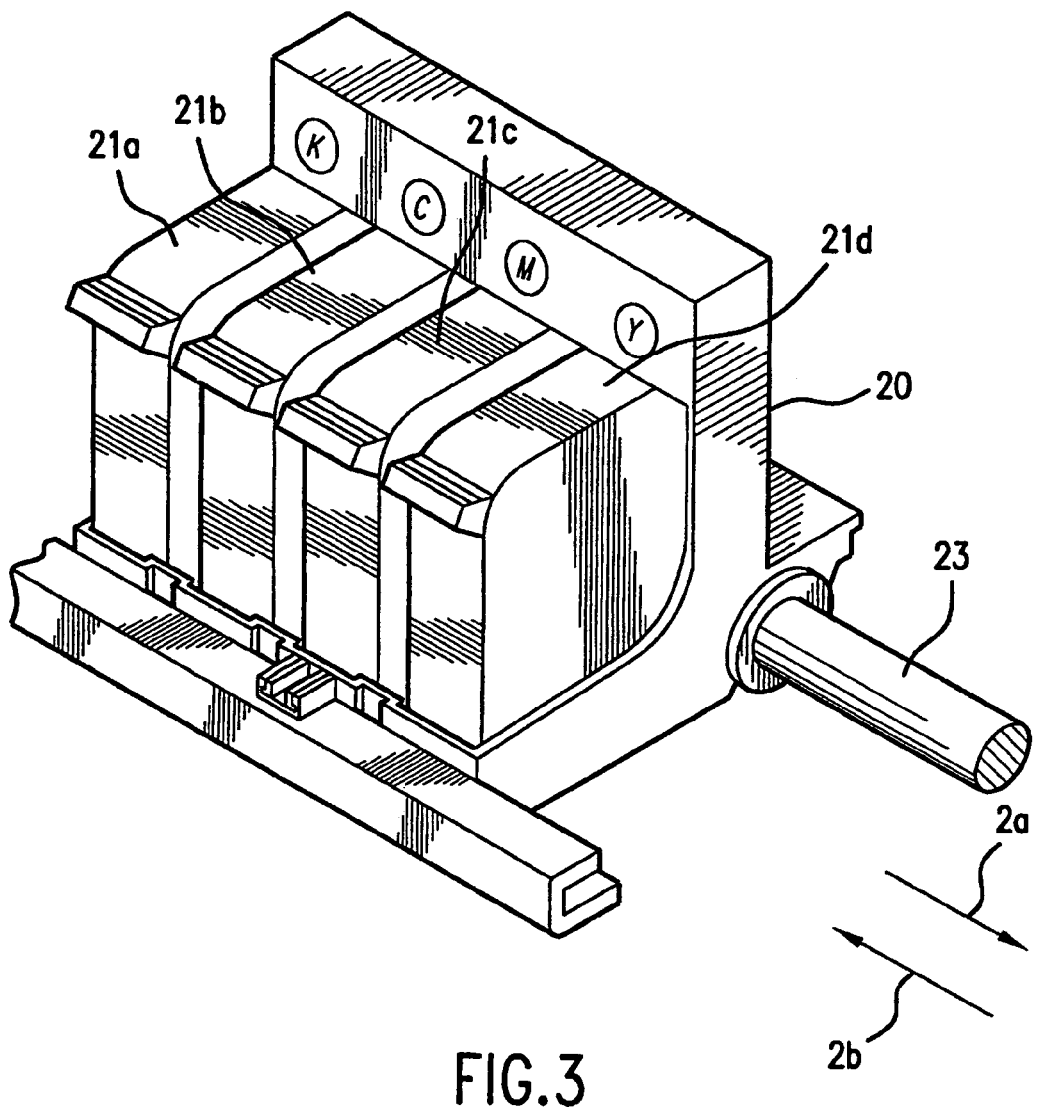
FIG. 3 is a perspective view of a portion of an exemplary print engine of FIG. 1 illustrating the relative placement of printheads in the scanning carriage.
Figure 4:
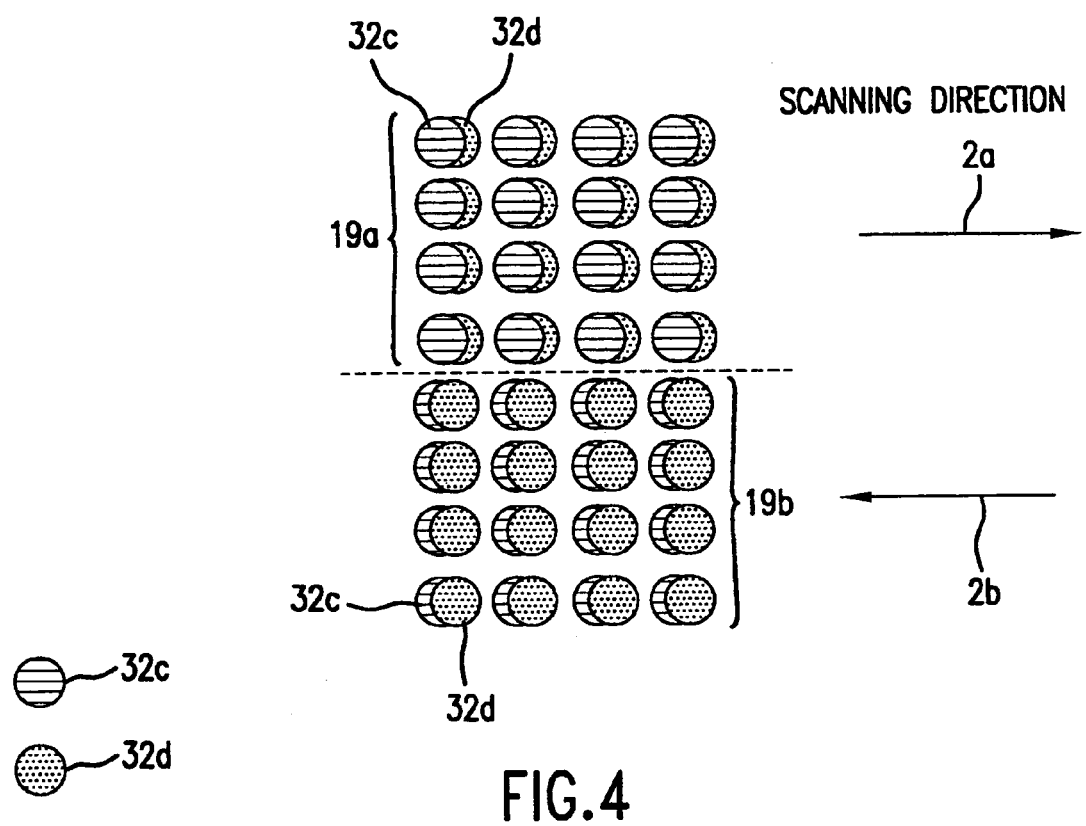
FIG. 4 is a schematic representation of direction-dependent ink drop deposition as performed by the exemplary print engine of FIG. 3.

Before discussing the novel printing system 10 in further detail, it is useful to consider, with reference to FIGS. 3 and 4, the effect on bidirectional hue shift of the positioning of the printheads 21 within the carriage 20. The exemplary arrangement illustrated includes, from left to right, a black printhead 21a, a cyan printhead 21b, a magenta printhead 21c, and a yellow printhead 21d. In the forward scanning direction 2a, the carriage 20 moves left to right, while in the rearward scanning direction 2b, the carriage 20 moves right to left. The nozzles 24 of each printhead are preferably arranged such that each prints the same rows 3 of pixel locations during a scan. For a region of pixel locations 19a, then, when the carriage 20 is scanned from left to right in the forward direction 2a, yellow would be printed first, then magenta over yellow, then cyan over magenta, and finally black over cyan. When the carriage 20 is scanned from right to left in the rearward direction 2b for a region of pixel locations 19b, black is printed first, over which cyan, magenta, and yellow are printed respectively. In order to print regions 19a–b in a uniform dark red color, for example, drops of magenta and yellow ink are printed in the same pixel locations 19. As the carriage 20 is scanned from left to right in the forward direction 2a, magenta drops 32c are printed over yellow drops 32d. As the carriage 20 is scanned from right to left in the rearward direction 2b, yellow drops 32d are printed over magenta drops 32c. Depending on the particular types of chemical and physical interactions between the ink drops 32c–d and the print medium 18, the region of red printed in one direction may have a yellowish cast, while the region of red printed in the other direction may have a magentaish cast, thus resulting in visually undesirable bidirectional hue shift.

Figure 5:
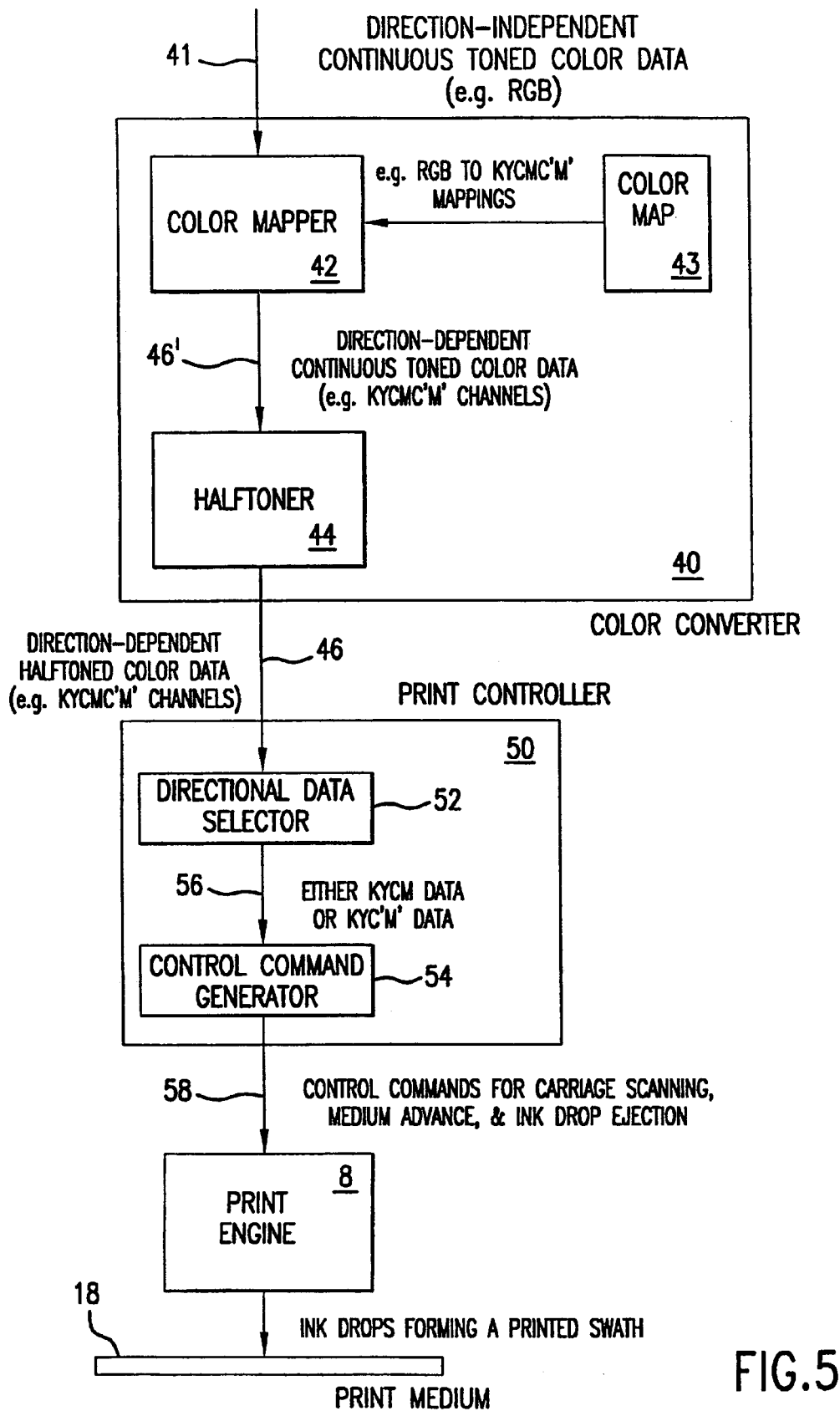
FIG. 5 is a functional block diagram of the color printing system of FIG. 2.
Figure 6:
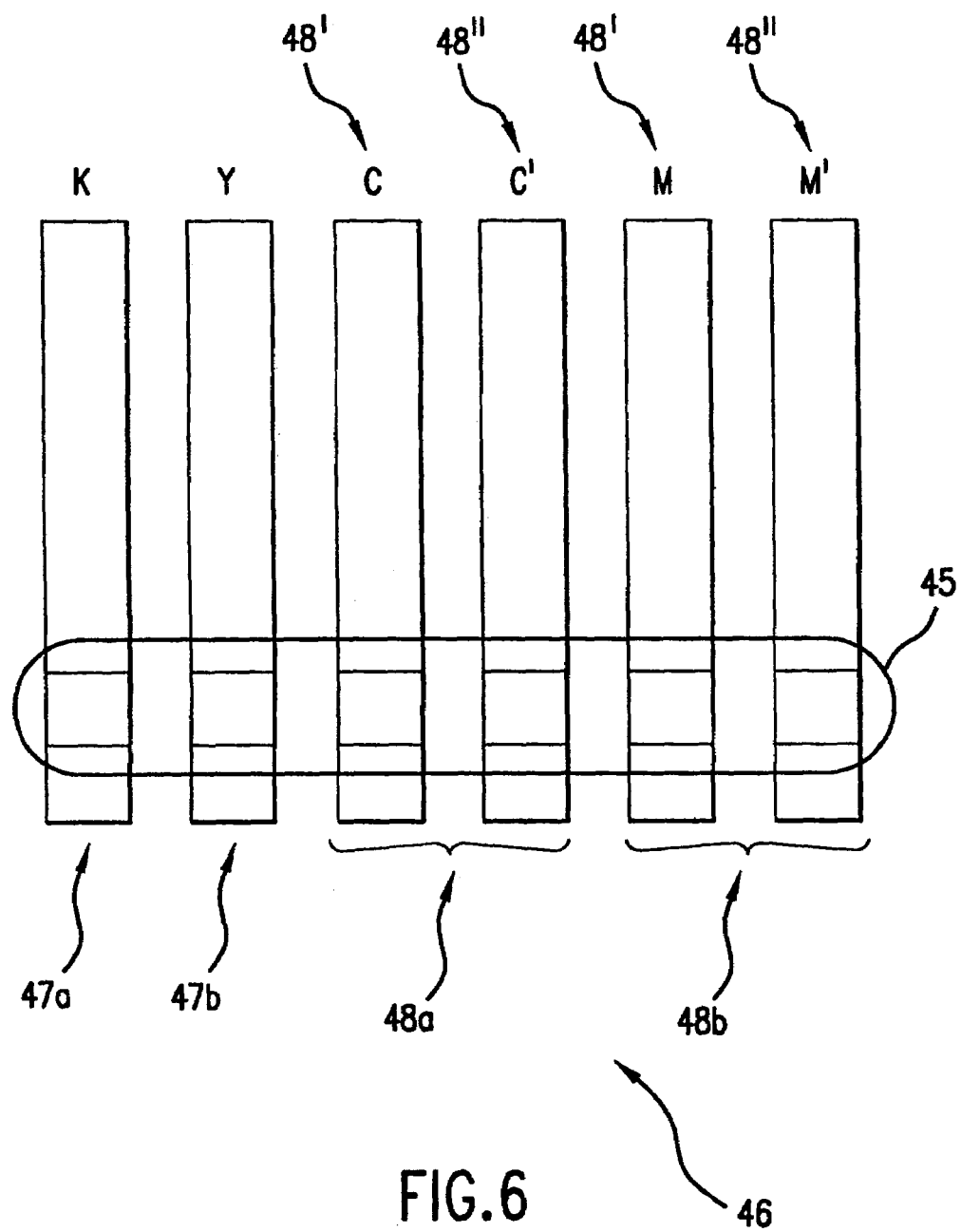
FIG. 6 is a schematic representation of exemplary data channels employed in an embodiment of the system of FIG. 5.

Returning now to a preferred embodiment of the printing system 10 to consider in further detail the color converter 40, and with reference to FIGS. 5 and 6, the color converter 40 receives color print data—typically from a computing apparatus (not shown) —via an input channel 41, and generates a set of data channels 46 that correspond to the ink colors of the printing system 10. These data channels 46 include at least one print-direction-independent data channel 47 for one ink color, and at least one pair of print-direction-dependent data channels 48 for another ink color. A data element in each channel 46 forms a set 45 that is associated with each pixel 19 location to be printed. One preferred embodiment of the data channels 46 includes a total of six data channels: one print-direction-independent data channel 47a for black (K) ink, another print-direction-independent data channel 47b for yellow (Y) ink, one pair of print-direction-dependent data channels 48a for cyan (C) ink, and another pair of print-direction-dependent data channels 48b for magenta (M) ink. One of each pair of print-direction-dependent data channels 48 is a forward-direction data channel 48' which contains the data used when scanning in the forward direction 2a, while the other of each pair of print-direction-dependent data channels 48 is a rearward-direction data channel 48" which contains the data used when scanning in the rearward direction 2b.

The data channel embodiment of the present invention is possible because it has been discovered that, for many types of media 18, not all ink colors contribute significantly to hue shift. By providing print-direction-dependent data channels 48 for only those ink colors which significantly contribute to hue shift, it is possible to significantly improve print quality in a four-color printing system 10 without the added costs of providing the eight data channels needed to implement print-direction-dependent data channels 48 for all four ink colors. Additionally, if a conventional printing system 10, which does not provide separate forward-direction data channels 48' and rearward-direction data channels 48", includes six data channels 48 but only uses four of them, the present invention can be implemented without significantly adding cost to the system 10.

By providing a pair of data channels 48 for those colors which affect hue shift, the color converter 40 generates the set of data channels 46 without having knowledge of the particular scanning direction 2 that will be used when the data is printed. Thus the present invention improves performance of the printing system 10 by allowing the color converter 40 to operate independently of, and in parallel with, the print controller 50 in a pipelined manner.

In some embodiments, the color converter 40 is implemented in hardware, such as an application-specific integrated circuit (not shown), or firmware executed by a microcontroller (not shown), of a printing device. In other embodiments, the color converter 40 is implemented in software, such as a printer driver (not shown), of a computing apparatus (not shown). All of these embodiments are known to those skilled in the art.

The color data provided to the color converter 40 via input channel 41 is preferably continuously-toned color data in RGB (red-green-blue) format, as known to those skilled in the art. Such RGB data is direction-independent, there being only a single channel for each of the R, G, and B color data. A color mapper 42 utilizes a novel color map 43 constructed according to the present invention to convert the continuously-toned RGB data into direction-dependent continuously-toned color data, exemplarily with intermediate versions 46' of the KYCMC'M' channels that have been described previously. The intermediate channels 46' which are output from the color mapper 42 are in turn input to a halftoner 44 which produces the halftoned KYCMC'M' data channels 46 which are sent to the print controller 50. The operation of color mappers using conventional color maps, and the operation of halftoners, are known to those skilled in the art and will not be discussed further herein.

Before discussing the novel printing system 10 in further detail, it is useful to consider, with reference to the exemplary FIG. 7, another embodiment of the present invention, a novel color map 43 usable with the color converter 40 for converting an input pixel having a print-direction-independent color into an output pixel having a print-direction-dependent color. The color map 43 has a plurality of table entries, each entry having a discrete input color value, such as value 62, and a corresponding discrete output color value, such as value 63. Each input color value 62 further comprises a prespecified combination of values of print-direction-independent input color primitives; the preferred embodiment utilizes red (R), green (G), and blue (B) color primitives. Each output color value, such as value 63, further comprises a prespecified combination of values of at least one print-direction-independent output color primitive 64 and at least one pair of print-direction-dependent output color primitives 66.

The preferred embodiment has black 64a and yellow 64b print-direction-independent output color primitives 64; forward-print-direction cyan 66a' and rearward-print-direction cyan 66a"; and forward-print-direction magenta 66b' and rearward-print-direction magenta 66b" print-direction-dependent output color primitives 66. One alternate embodiment of the color map 43 includes black, yellow, light cyan, and light magenta print-direction-independent output color primitives 64; forward-print-direction dark cyan and rearward-print-direction dark cyan; and forward-print-direction dark magenta and rearward-print-direction dark magenta output color primitives 66. Another alternate embodiment of the color map 43 has magenta and cyan print-direction-independent output color primitives 64; forward-print-direction black and rearward-print-direction black; and forward-print-direction yellow and rearward-print-direction yellow output color primitives 66. Which particular primitives are dependent on, or independent of, print direction is determined by the color and properties of the corresponding inks, and the interactions of these inks with the intended print media.

For some color values 63, each of the pairs of print-direction-dependent output color primitives 66 may have different primitive values. For example, the value of forward-direction cyan 66a' for "very dark blue" is 160, while the value of rearward-direction cyan 66a" is 170. Similarly, the value of forward-direction magenta 66b' for "very dark blue" is 200, while the value of rearward-direction magenta 66b" is 185. The differing forward-direction and rearward-directions values are chosen to compensate for the hue shift that would otherwise occur, and as a result the amount of bidirectional hue shift can be reduced with use of such a color map 43.

Figure 2:
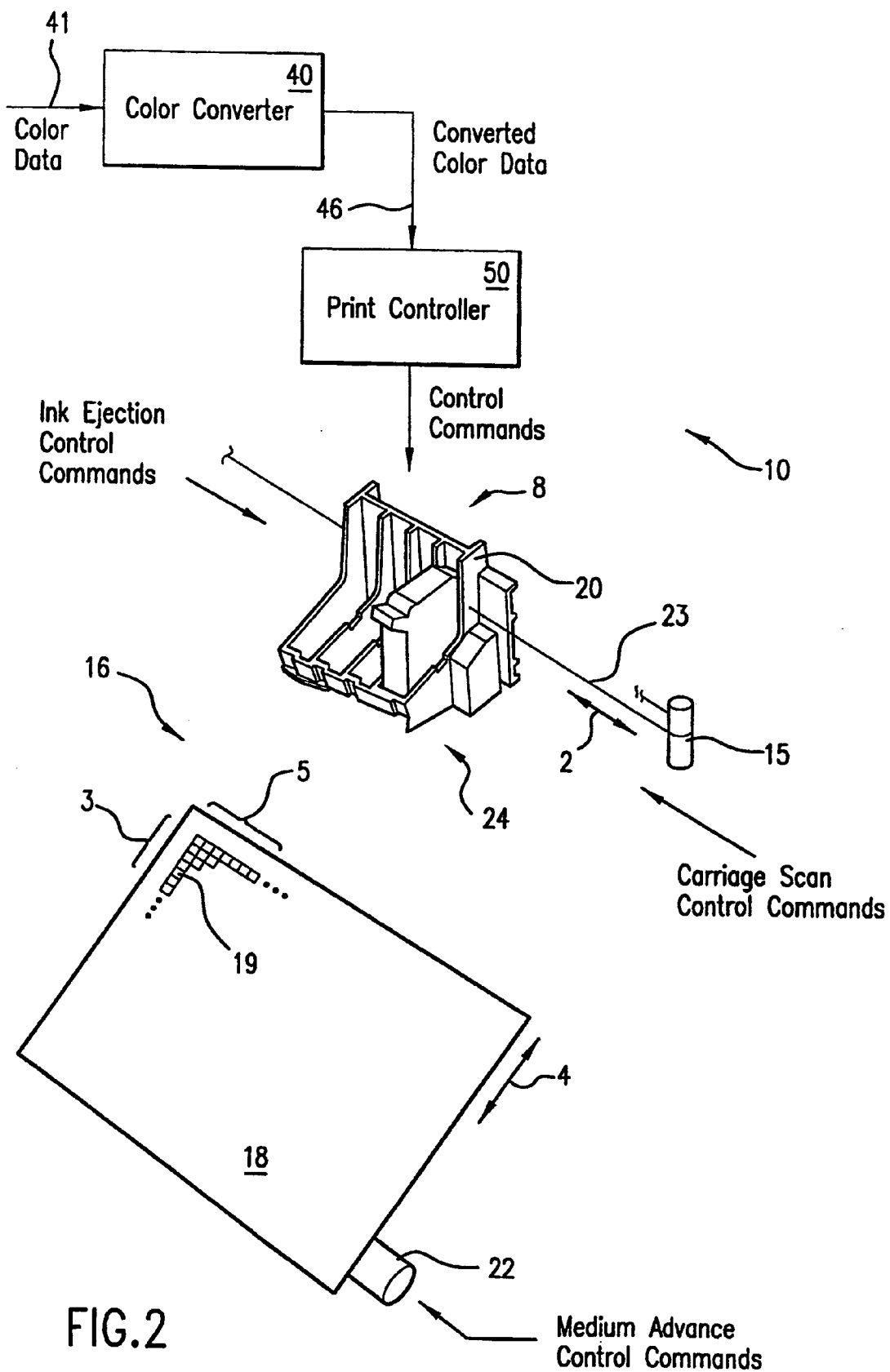
FIG. 2 is a schematic representation of a color printing system according to the present invention.

Returning now to a preferred embodiment of the printing system 10 to consider in further detail the print controller 50, and with reference to FIGS. 2 and 5, the print controller 50 receives the data channels 46 from the color converter 40, and determines how and when to print spots of ink on the medium 18 corresponding to the pixel data in the proper ones of the data channels 46. As is known to those skilled in the art, the controller 50 orchestrates printing by issuing carriage scan control commands to the scan drive mechanism 15 which moves the carriage 20 along the slider bar 23 relative to the medium 18 in the scan direction 2, by issuing medium advance control commands to the medium drive mechanism 22 which moves the medium 18 relative to the carriage 20 in the medium advance direction 4, and by issuing ink ejection control commands to the appropriate print cartridge 21 to eject the droplets of fluid from the nozzles 24 onto the medium 18.

With regard to selecting the proper ones of the data channels 46 for use in printing, the print controller 50 prints data from the print-direction-independent data channels 47 during scanning in both scan directions 2a,2b, and from a different one of each pair of print-direction-dependent data channels 48 during scanning in each opposite direction 2a,2b. The controller 50 determines which of each pair of data channels 48 to use during printing in a particular scanning direction 2a,2b so as to cause a particular color of print data to have the same perceived color shade when printed in the forward scanning direction 2a as when printed in the rearward scanning direction 2b. For the exemplary data channels 46 of FIG. 6, the controller 50 will use the K 47a, Y 47b, C 48a', and M 48b' data channels when printing in the forward scan direction 2a, and the K 47a, Y 47b, C' 48a", and M' 48b" data channels when printing in the rearward scan direction 2b.

The controller 50 includes a control command generator 54 which generates the control commands 58 for carriage scanning, medium advance, and ink drop ejection from the printheads 21, and communicates them to the print engine 8.

Since the controller 50 determines the scanning direction, the controller 50 further includes a directional data selector 52 which selects the appropriate ones of the data channels 46 as just described and transmits the appropriate channels 56 to the control command generator 54.

Figure 8:
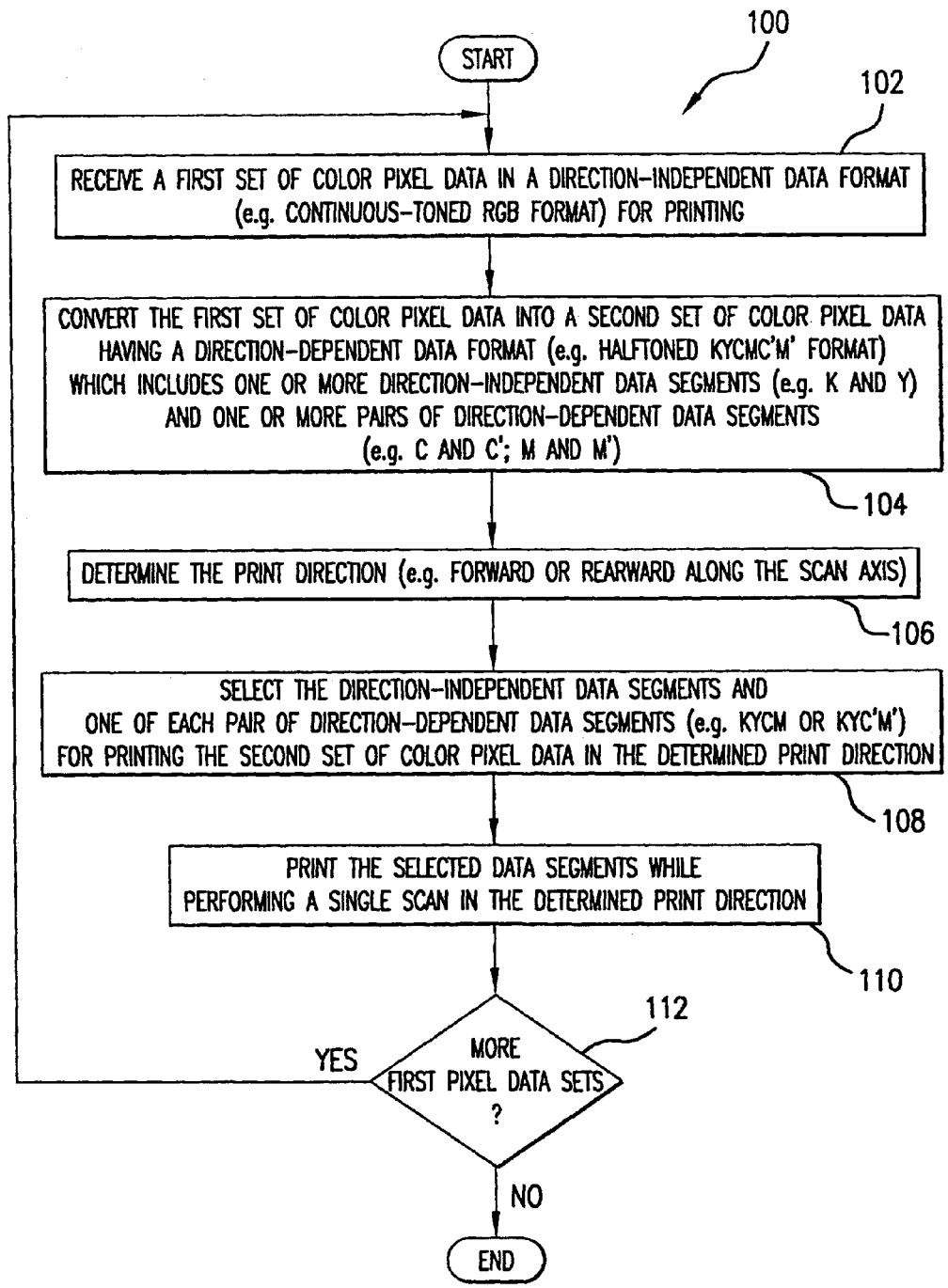
FIG. 8 is a flowchart of a bidirectional printing method according to the present invention which reduces hue shift in single-pass printing.

Another embodiment of the present invention, as best understood with reference to FIG. 8, is a method 100 for printing with a bidirectional inkjet printer 10. In general, the method 100 converts direction-independent print data to a direction-dependent form and selects the appropriate direction-dependent data corresponding to the current scanning direction of printing, thus reducing bidirectional hue shift so that a data region representative of a particular color has the same perceived color shade when printed in either the forward print direction 2a or the rearward print direction 2b.

The method 100 begins, at 102, by receiving a first set of color pixel data in a direction-independent data format (e.g. continuous-toned RGB format) for printing. Preferably the first set of color pixel data corresponds to the data for a single swath. At 104, the first set of color pixel data is converted into a second set of color pixel data having a direction-dependent data format (e.g. halftoned KYCMC'M' format) which includes one or more direction-independent data segments (e.g. K and Y channels) and one or more pairs of direction-dependent data segments (e.g. C and C'; M and M' channels). Each data segment is preferably associated with a different color ink. At 106, the print direction (e.g. forward 2a or rearward 2b along the scan axis 2) is determined. At 108, the data segments to be used for printing the second set of color pixel data in the determined print direction 2a,2b are selected. The selected data segments include all of the direction-independent data segments, and one of each pair of direction-dependent data segments (e.g. KYCM or KYC'M' channels). At 110, the selected data segments are printed while performing a single scan in the determined print direction 2a,2b. If there are more first pixel data sets ("Yes" branch of 112), then the method continues at 102; otherwise ("No" branch of 112) the method concludes.

Figure 9:
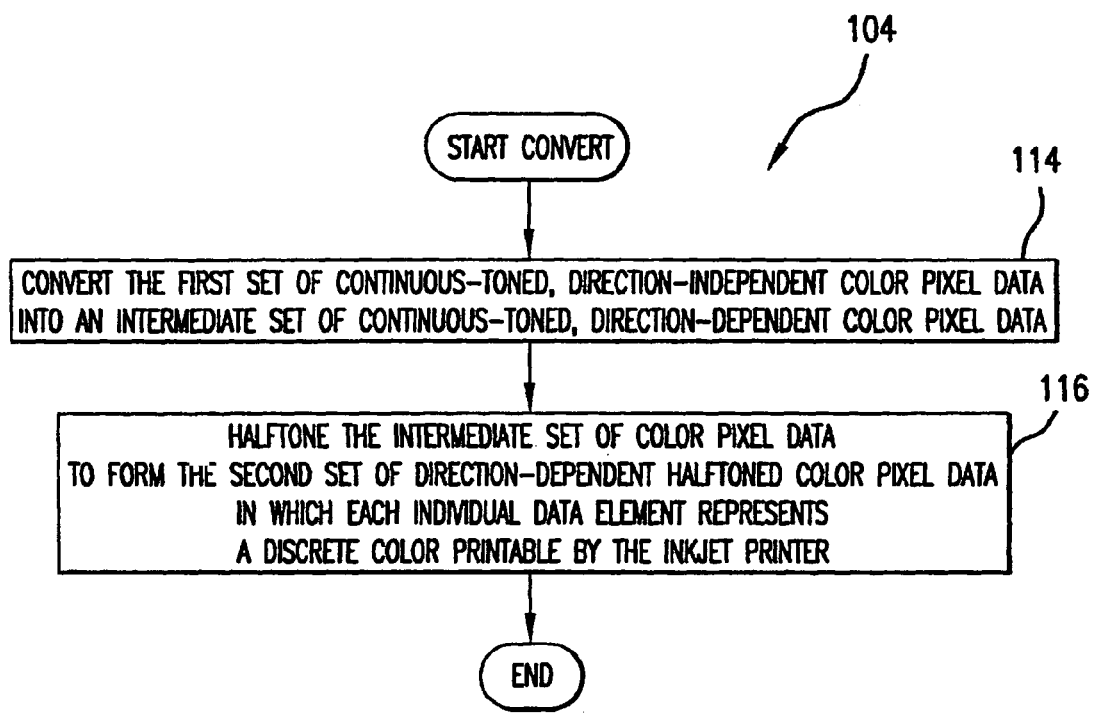
FIG. 9 is a more detailed flowchart of the conversion portion of the printing method of FIG. 8.

Considering now in further detail the converting 104 of the first set of color pixel data into the second set of color pixel data, and with reference to FIG. 9, the process begins at 114 by converting the first set of continuous-toned, direction-independent color pixel data into an intermediate set of continuous-toned, direction-dependent color pixel data having a direction-dependent data format. At 116, the intermediate set of color pixel data is halftoned to form the second set of direction-dependent halftoned color pixel data in which each individual data element represents a discrete color printable by the inkjet printer.

From the foregoing it will be appreciated that the color printing system, color map, and bidirectional printing method provided by the present invention represent a significant advance in the art. Although several specific embodiments of the invention have been described and illustrated, the invention is not limited to the specific methods, forms, or arrangements of parts so described and illustrated. In particular, while embodiments of the invention in systems having four and six color inks and two direction-dependent channels have been illustrated, the invention is not limited to the illustrated configurations. Other ink and media combinations may have more or fewer direction-dependent data channels, or different color inks may be the dominant ones for hue shift. The invention is limited only by the claims.

What is claimed is:

1. A method for printing with a bidirectional inkjet printer, comprising:
   converting a first set of color pixel data having a direction-independent data format into a second set of color pixel data having a direction-dependent data format, the direction-dependent data format including at least one direction-independent data segment and at least one pair of direction-dependent data segments; and
   selecting the at least one direction-independent data segment and one of each of the at least one pair of direction-dependent data segments for printing the second set of color pixel data in a corresponding print direction.

2. The method of claim 1, wherein the selecting further includes:
   selecting the at least one direction-independent data segment and one of each of the at least one pair of direction-dependent data segments for printing the second set of color pixel data in a forward direction; and
   selecting the at least one direction-independent data segment and the other one of each of the at least one pair of direction-dependent data segments for printing the second set of color pixel data in a rearward direction.

3. The method of claim 1, wherein the converting and selecting operate such that a data region in the first set representative of a particular color has the same perceived color when printed in a forward print direction and a rearward print direction.

4. The method of claim 1, comprising:
   receiving a plurality of first sets of color pixel data;
   determining for each first set of color pixel data the corresponding print direction for the corresponding second set of color pixel data; and
   printing the selected data segments for each second set of color pixel data.

5. The method of claim 4, wherein the printing of all data segments of an individual second set of color pixel data is performed in a single scan.

6. The method of claim 1, wherein the first set of color pixel data is in RGB format.

7. The method of claim 6, wherein the second set of color pixel data is in KYCMC'M' format.

8. The method of claim 6, wherein the second set of color pixel data is in KYcmCMC'M' format.

9. The method of claim 7, wherein the at least one direction-independent data segment is a K data segment and a Y data segment, and wherein the at least one pair of direction-dependent data segments are a C and C' pair of data segments and an M and M' pair of data segments.

10. The method of claim 7, wherein the at least one direction-independent data segment is a C data segment and an M data segment, and wherein the at least one pair of direction-dependent data segments are a K and K' pair of data segments and a Y and Y' pair of data segments.

11. The method of claim 1, wherein the first set of color pixel data is continuous-toned data and the second set of color pixel data is halftoned data wherein each individual data element represents a discrete color printable by the inkjet printer.

12. The method of claim 11, wherein the converting further comprises:
   color-converting the first set of color pixel data into an intermediate set of continuous-toned direction-dependent color pixel data; and halftoning the intermediate set to form the second set of color pixel data in which each individual data element represents a discrete color printable by the inkjet printer.

13. The method of claim 1, wherein each direction-independent data segment and each pair of direction-dependent data segments is associated with a different color ink.

14. The method of claim 1, wherein each individual one of the pair of direction-dependent data segments is associated with a same color ink.

15. A color map for converting an input pixel having a print-direction-independent color into an output pixel having a print-direction-dependent color, comprising:
a plurality of table entries, each entry having a discrete input color value and a corresponding discrete output color value;
wherein each input color value further comprises a prespecified combination of primitive values for print-direction-independent input color primitives, and
wherein each output color value further comprises a prespecified combination of primitive values for at least one print-direction-independent output color primitive and at least one pair of print-direction-dependent output color primitives.

16. The color map of claim 15, wherein:
each print-direction-independent output color primitive is associated with a different one of a set of first colors,
each pair of print-direction-dependent output color primitives is associated with a different one of a set of second colors, and
both individual ones of each pair of print-direction-dependent output color primitives are associated with a same one of the set of second colors.

17. The color map of claim 15, wherein:
the print-direction-independent input color primitives are red, green, and blue;
the at least one print-direction-independent output color primitive are black and yellow; and
the at least one pair of print-direction-dependent output color primitives are forward-print-direction cyan and rearward-print-direction cyan, and forward-print-direction magenta and rearward-print-direction magenta.

18. The color map of claim 15, wherein:
the print-direction-independent input color primitives are red, green, and blue;
the at least one print-direction-independent output color primitive are black, yellow, light cyan, and light magenta; and
the at least one pair of print-direction-dependent output color primitives are forward-print-direction dark cyan and rearward-print-direction dark cyan, and forward-print-direction dark magenta and rearward-print-direction dark magenta.

19. The color map of claim 15, wherein:
the print-direction-independent input color primitives are red, green, and blue;
the at least one print-direction-independent output color primitive are magenta and cyan; and
the at least one pair of print-direction-dependent output color primitives are forward-print-direction black and rearward-print-direction black, and forward-print-direction yellow and rearward-print-direction yellow.

20. The color map of claim 15, wherein each of the at least one pair of print-direction-dependent output color primitive values are different for at least some of the table entries.

21. A color printing system, comprising:
a print engine for controllably ejecting drops of colored inks during bidirectional scanning;
a color converter adapted to receive color print data and generate a set of data channels relating to the colored inks, the data channels including at least one print-direction-independent data channel and at least one pair of print-direction-dependent data channels; and
a print controller communicatively coupled to the color converter for receiving the data channels and to the print engine for controlling the scanning direction and the ejecting, the controller configured to print data from the at least one print-direction-independent data channel during scanning in both directions and from a different one of the at least one pair of print-direction-dependent data channels during scanning in each opposite direction.

22. The color printing system of claim 21, wherein the color print data is continuously-toned and the set of data channels is halftoned, and wherein the color converter further comprises:
a color mapper adapted to receive the color print data and generate a continuously-toned set of intermediate data channels according to a color map; and
a halftoner communicatively coupled to the color mapper for converting the continuously-toned set of intermediate data channels to the halftoned set of data channels.

23. A color printing system, comprising:
a print engine for controllably ejecting drops of colored inks during bidirectional scanning;
a color converter adapted to receive color print data and generate a set of data channels relating to the ink colors of the system, the data channels including a single data channel for some ink colors and a pair of data channels for other ink colors; and
a print controller communicatively coupled to the color converter for receiving the data channels and to the print engine for controlling the scanning direction and the ejecting, the controller configured to determine which of the pair of data channels to use during printing in a particular scanning direction so as to cause a particular color of print data to have the same perceived color when printed in either scanning direction.

24. The color printing system of claim 23, wherein the color converter generates the set of data channels without knowledge of the particular scanning direction.

* * * * *